US011618688B2

(12) United States Patent
Trampe (10) Patent No.: US 11,618,688 B2
(45) Date of Patent: Apr. 4, 2023

(54) PERMANENT STORAGE OF CARBON DIOXIDE

(71) Applicant: Climate Solutions Aps, Charlottenlund (DK)

(72) Inventor: Erik Trampe, Charlottenlund (DK)

(73) Assignee: Climate Solutions ApS, Charlottenlund (DK)

( * ) Notice: Subject to any disclaimer, the term of this patent is extended or adjusted under 35 U.S.C. 154(b) by 0 days.

(21) Appl. No.: 17/050,304

(22) PCT Filed: May 2, 2019

(86) PCT No.: PCT/EP2019/061254
§ 371 (c)(1),
(2) Date: Oct. 23, 2020

(87) PCT Pub. No.: WO2019/211381
PCT Pub. Date: Nov. 7, 2019

(65) Prior Publication Data
US 2021/0114892 A1   Apr. 22, 2021

(30) Foreign Application Priority Data
May 2, 2018   (EP) ..................................... 18170406

(51) Int. Cl.
*C01F 11/18* (2006.01)
*B01D 9/00* (2006.01)
*B01D 53/62* (2006.01)

(52) U.S. Cl.
CPC ............ *C01F 11/181* (2013.01); *B01D 9/005* (2013.01); *B01D 53/62* (2013.01);
(Continued)

(58) Field of Classification Search
CPC ....... C01F 11/181; B01D 9/005; B01D 53/62; B01D 2251/404; B01D 2251/606; B01D 2252/1035; B01D 2257/504
(Continued)

(56) References Cited

U.S. PATENT DOCUMENTS

| 2012/0111236 A1 | 5/2012 | Constantz et al. |
| 2014/0072503 A1 | 3/2014 | Shimoda |
| 2016/0121298 A1 | 5/2016 | Constantz et al. |

FOREIGN PATENT DOCUMENTS

| FR | 2058203 | 5/1971 |
| JP | 20140080648 | 11/2015 |

(Continued)

OTHER PUBLICATIONS

Sanchez-Pastor, N. et al, "Crystallization of ikaite and its pseudomorphic transformation into calcite: raman spectroscopy evidence", Geochimica Et Cosmochimica ACTA, Pergamon Press, New York, NY, XP029401101, vol. 175(15), pp. 271-281, (Dec. 2015).
(Continued)

*Primary Examiner* — Anita Nassiri-Motlagh
(74) *Attorney, Agent, or Firm* — McHale & Slavin, P.A.

(57) ABSTRACT

Disclosed is a method for fast and cost-efficient preparation of ikaite crystals. The method comprises contacting an alkaline aqueous solution, which comprises carbonate and bicarbonate ions, with a water solution, which comprises $Ca^{2+}$, at a temperature not exceeding 15° C., wherein contact between the alkaline aqueous solution and the water solution takes place at a permeable or porous surface, through which either solution is fed to the other at a flow rate facilitating formation of ikaite crystals. Also disclosed is system for carrying out the ikaite preparation process. The process and system provides a cost efficient and effective means for capture and storage of carbon dioxide.

32 Claims, 4 Drawing Sheets

(52) U.S. Cl.
CPC .. *B01D 2251/404* (2013.01); *B01D 2251/606* (2013.01); *B01D 2252/1035* (2013.01); *B01D 2257/504* (2013.01)

(58) Field of Classification Search
USPC .......................................................... 423/637
See application file for complete search history.

(56) References Cited

FOREIGN PATENT DOCUMENTS

NO          980024 L     7/1999
NO          980575 L     8/1999

OTHER PUBLICATIONS

Buchardt, B. et al, "Ikaite tufa towers in Ikka Fjord, Southwest Greenland: their formation by mixing of seawater and alkaline spring water", Journal of Sedimentary Research, XP055600163, vol. 71(1), pp. 176-189, (Jan. 2001).

Stockmann, G. et al, "Control of a calcite inhibitor (phosphate) and temperature on ikaite precipitation in Ikka Fjord, southwest Greenland", Applied Geochemistry, vol. 89, pp. 11-22, (2018).

Hu, Y. et al, "A laboratory study of ikaite ($CaCO_3*6H_2O$) precipitation as a function of pH, salinity, temperature and phosphate concentration", Marine Chemistry, vol. 162, pp. 10-18, (2014).

Seaman, P. et al, "The columns of ikaite tufa in Ikka Fjord, Greenland", Geoscience, vol. 44, pp. 4-35, http://www.mtp.hum.ku.dk/details.asp?eln=202832, (2006).

Bischoff, J. et al, "Ikaite precipitation by mixing of shoreline springs and lake water, Mono Lake, California, USA", Geochimica et Cosmochimica Acta, vol. 57(16), pp. 3855-3865, (Aug. 1993).

PERMANENT STORAGE OF CARBON DIOXIDE

CROSS REFERENCE TO RELATED APPLICATIONS

This is a national stage filing in accordance with 35 U.S.C. § 371 of PCT/EP2019/061254, filed May 2, 2019, which claims the benefit of the priority of European Patent Application No. 18170406.5, filed May 2, 2018, the contents of each are incorporated herein by reference.

FIELD OF THE INVENTION

The present invention relates to the field of clean tech. In particular, the present invention relates to the field of environmental $CO_2$ reduction, $CO_2$ capture, and storage of $CO_2$ in a stable solid product.

BACKGROUND OF THE INVENTION

There is a universal consensus that global climate change is occurring, and evidence shows that the main cause to this is anthropogenic emissions of greenhouse gases into the atmosphere.

Carbon dioxide ($CO_2$) is a greenhouse gas, absorbing heat from solar radiation in the atmosphere. Increasing levels of $CO_2$ and other greenhouse gasses are being released into the atmosphere and leads to increasing global temperatures as well as acidification of the oceans. $CO_2$ is primarily being released through human activities such as burning of fossil fuels, industry activities and deforestation, as well as by means of natural contributions as e.g. by volcanic eruptions and biological respiration. The ongoing increase in atmospheric $CO_2$ levels has led to global climate change, inducing warmer global temperatures. As the temperature rises due to increasing $CO_2$ levels, global weather patterns are changing, resulting in increasingly severe storms in the tropics, draughts, massive rainfall, and melting of the icecaps, yielding rising sea levels just to mention some of the consequences.

Furthermore, the uptake of an increasing level of atmospheric $CO_2$ by the oceans is lowering the seawater pH levels to the detriment for many important marine ecosystems. Ocean acidification e.g. affects coral reefs all over the tropics, and as the reefs constitute a vital source of food for millions of people, as well as being billion-dollar industries, covering fisheries and tourism, societies as well as natural ecosystems are extremely vulnerable to the effects of the increasing $CO_2$ levels.

The consequences of global climate changes already being observed as well as what is projected are very severe, and have now raised an immense scientific, public and political awareness, resulting in global efforts now combatting climate change, aiming to lower $CO_2$ emissions, halting or even reversing global climate changes. International political agreements now seek to accelerate and intensify the actions and investments needed for a sustainable low carbon future.

Besides limiting the amount of $CO_2$ being released into the atmosphere, great research and many efforts to capture and store $CO_2$ has also been made. Several companies have now developed systems performing direct carbon capture from the atmosphere. However, $CO_2$ is in most cases stored as compressed gas, and is re-used in industry ending up being re-released into the atmosphere. Other attempts are being made to store captured $CO_2$ by sequestration in geologic formations, the drawback being high energy requirements and risk of gases leaking back out into the atmosphere.

Ikaite ($CaCO_3 \cdot 6H_2O$), a hydrated form of calcite, is a mineral that exist in unique tufa columns in Ikka Fjord in South Western Greenland. Synthesis of ikaite has previously been realized in laboratory scale, however only in small quantities, over long periods of time, and only yielding very small crystals, in the size order of 20-100 µm. Synthesis has mainly been performed to investigate the properties of natural systems where ikaite occurs, and has been performed in various ways, by rapidly mixing of solutions, either directly or by dripping into a continuously stirred solution. Some has then left these mixtures to allow crystallization to occur for weeks or months, common for all is a low yield of ikaite in the form of very small crystals. However, to date, it has not been possible to produce ikaite at a rate or under conditions that would render practical use of ikaite for any purpose realistic. For these previous investigations into ikaite preparation, see e.g. Hu Y-B et al. (2014), Marine Chemistry 162: 10-18 and Stockmann G et al. (2018), Applied Geochemistry 89: 11-22.

US 2016/0121298 discloses a method for producing a $CO_2$ sequestering carbonate material where a divalent cation source (such as a $Ca^{2+}$ containing liquid) is introduced into a flowing aqueous bicarbonate or carbonate containing liquid. US 2016/0121298 does not mention any specific method steps or parameters for preparation of ikaite as opposed to other carbonate species.

OBJECTS OF THE INVENTION

It is an object of embodiments of the invention to provide methods and means for preparation of ikaite and calcite so as to facilitate reduction in carbon dioxide from emissions or in atmospheric carbon dioxide.

SUMMARY OF THE INVENTION

It has been found by the present inventor that it is possible by means of a simple and economically attractive process to prepare large amounts of ikaite at a hitherto unprecedented speed. Further, it has been found that ikaite can be prepared from aqueous solutions where an appreciable amount of carbon dioxide derived carbonate and bicarbonate is dissolved. The technology presented herein thus yields significantly larger ikaite crystals than ever seen before and thereby a simple means of capturing gaseous carbon dioxide is provided. So in a very generic aspect, the present invention relates to use of ikaite as a means of storage/reduction of carbon dioxide. For this purpose the present invention provides a number of practical solutions to fast and reliable methods for ikaite production.

The present invention stands out from other ways of synthesizing ikaite, as the method developed to produce ikaite detailed below is taking a different approach than what has previously been done, and further by the goal of storing $CO_2$ in the end product being either ikaite, calcite or other morphs of $CaCO_3$ for permanent carbon capture and $CO_2$ removal. The advantage of storing $CO_2$ with ikaite being an intermediate form is the low energy required for the ikaite crystallization to occur as well as for the following transformation to calcite, and thereby being a very economical way to achieve permanent $CO_2$ storage.

The invention relies on the creation of a chemical gradient between two layers, one layer being the solutions e.g. as provided in formulae 1-5 in the examples, and the other being of ASW (Artificial Sea Water) or a similar water solution. Thus, the present invention aims at creating a constant microenvironment where bicarbonate/carbonate solutions mix with the ASW, yielding crystals considerably larger than in any earlier experiments where synthetic ikaite crystals have been in the range of 20-40 µm; the method in this invention yields large synthetic ikaite crystals in different sizes, some >2 mm, most <1-1.5 mm, and some very small, <100 µm. The controlled mixing that creates this chemical layering also ensures an optimal contact interface allowing for more efficient precipitation of crystals and hence better utilization of the solutions employed.

The amount and size of crystals, together with speed of precipitation achieved by using the present invention greatly surpasses those previously achieved. This method thus gives good reason to incorporate the invention in either $CO_2$ capturing plants, already harvesting $CO_2$ from the atmosphere, flue gasses or by other means.

The inventive method for preparation of ikaite can thus be carried out by establishing a steady interface between an alkaline aqueous solution and a (saline) water solution (see details below). Instead of instantaneously mixing the two solutions, the presence of the steady interface has been demonstrated to provide for an environment facilitating the formation of the ikaite crystals. But, since the two solutions that meet in the interface are fully compatible, it is according to the findings made by the inventor a huge advantage to feed one of the solutions into the other at a slow rate via a surface that separates the two solutions because this will maintain the interface and also provide a surface on which crystals can be seeded and subsequently grow. It will be understood, however, that the surface is not essential for merely preparing ikaite crystals—the essential feature appears to be the maintenance of a steady interface.

Figure 6:
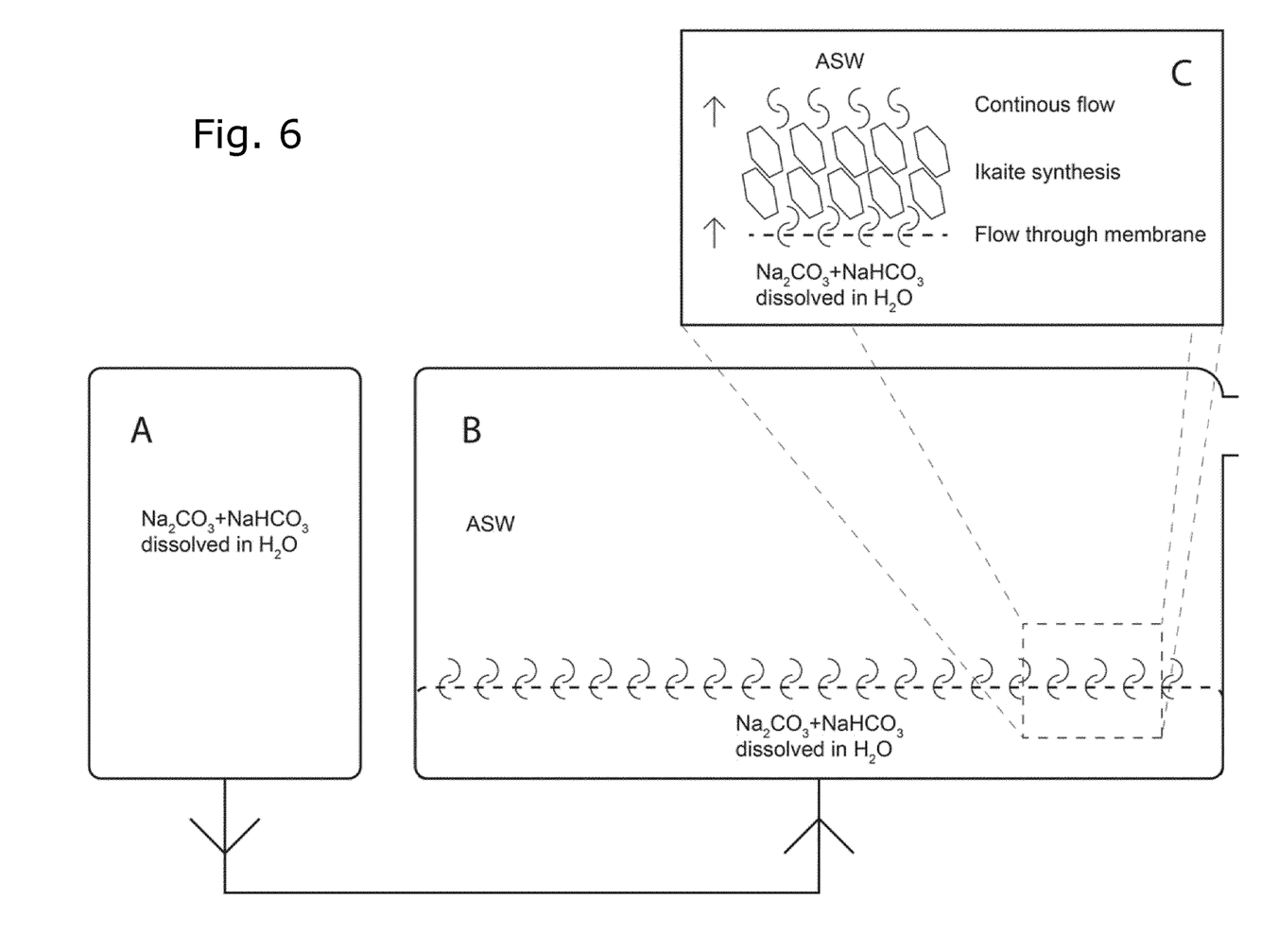
FIG. 6 shows a schematic depiction of an embodiment of a system of the third aspect of the invention.

So, in a first aspect the present invention relates to a method for preparation of ikaite, comprising contacting an alkaline aqueous solution, which comprises carbonate and bicarbonate ions, with a water solution, which comprises $Ca^{2+}$, at a temperature not exceeding 15° C., wherein contact between the alkaline aqueous solution and the water solution takes place at a permeable or porous surface, through which the alkaline aqueous solution is fed to the water solution or through which the water solution is fed to the alkaline aqueous solution at a flow rate facilitating formation of ikaite crystals. FIG. 6 presents in schematic form an embodiment of the setup, where the permeable surface is in the form of a membrane.

In a second aspect, the invention relates to a method for storage/reduction of carbon dioxide, comprising preparation of an alkaline aqueous solution defined in the first aspect of the invention set forth above by addition of carbon dioxide to an alkaline aqueous medium, subsequently preparing ikaite according to the method of the first aspect of the invention or preparing calcite or other carbonate forms prepared from said ikaite and subsequently storing the ikaite and/or carbonate forms produced.

In a third aspect, the present invention provides a system for preparation of ikaite, comprising
- at least one compartment for holding an alkaline aqueous solution, which comprises carbonate and bicarbonate,
- at least one compartment for holding a water solution, which comprises $Ca^{2+}$,
- at least one permeable or porous structure for separating the alkaline aqueous solution and the water solution, said permeable or porous structure allowing feeding through at least one surface of the structure 1) of the alkaline aqueous solution to the water solution or 2) of the water solution to the alkaline aqueous solution,
- a mechanism for causing the feeding of either the alkaline aqueous or the water solution through the at least one surface of the structure.

DETAILED DISCLOSURE OF THE INVENTION

Definitions

A "water solution" is in the present context an aqueous solution of slightly or moderate basic pH, which typically will contain calcium ions; often the water solution will be a saline water solution, i.e. a water solution comprising NaCl as the major salt species. An example of a (saline) water solution is natural seawater. The salinity is of lesser importance than the pH and the content of calcium ions. Hence, the presence of NaCl is not mandatory in a water solution even though it is preferred due to the easy access to e.g. natural seawater. It must be noted that the ionic strength of the water solutions used in the present invention may be regulated according to need, but that values that are typical for natural seawater (I≈0.7 M) are preferable.

An "alkaline aqueous solution" as used herein means an aqueous solution, which has a basic pH and which must comprise a carbonate/bicarbonate buffer system.

A "permeable or porous surface" is in the present context a surface through which an alkaline aqueous solution or a water solution is capable of being fed into a surrounding or adjacent solution. The exact form and composition of the permeable or porous surface is not essential. It can be e.g. comprised of one or more faces of a structure made from a porous material such as porous rock, porous stone, a porous ceramic material, a metal, rubber or plastic surface comprising multiple perforations, a membrane material and any other material or structure through which a solution can be introduced and subsequently leave when forming an interface with a second solution because the structure including the surface has a sufficiently high hydraulic conductivity to allow a liquid to be fed via the structure through the surface to contact with the other solution.

Specific Embodiments of the Invention

Method of the First Aspect of the Invention

As set forth above, the first aspect relates to a method for preparation of ikaite (that is: $CaCO_3 \cdot 6H_2O$), comprising contacting an alkaline aqueous solution, which comprises carbonate and bicarbonate ions, with a water solution, which comprises $Ca^{2+}$, at a temperature not exceeding 15° C., wherein contact between the alkaline aqueous solution and the water solution takes place at a permeable or porous surface, through which the alkaline aqueous solution is fed to the water solution or through which the water solution is fed to the alkaline aqueous solution at a flow rate facilitating formation of ikaite crystals.

By feeding either solution through the porous surface to contact the other solution it is achieved that a steady or quasi-steady interface zone between the two solutions can be created thereby facilitating the ikaite formation in the interface zone, typically on the porous surface but also in the interface where a gradient exists between the two solutions. An important feature is in this context that the flow rate of the solution being fed into the other is carefully controlled (e.g. by means of a pumping system or by use of gravitational force) so as to maintain the interface zone over a prolonged period. In fact, by controlling the feed of solution through the porous surface, waste of reactants can be avoided by ensuring that a maximum formation of ikaite is also taking place in the liquid interface.

It is in practice also possible to create the necessary interface zone between the two solutions by establishing layers (strata) of the solutions having different densities—this principle is known when establishing a gradient of e.g. sucrose when performing differential centrifugation. In such a setup the formation of the ikaite crystals will take place in the interface between strata where the reactant concentrations are optimal for the ikaite formation to take place. However, feeding of a solution through a porous surface is preferred because this technology facilitates that a controlled amount of solution is contacted with the other solution over time in a simple manner, whereas establishment of permanent strata/layers of different densities is more difficult to control in terms of constant addition of reactants. And, if using a system with e.g. parallel laminar flow of solutions, it cannot be expected that optimum reaction conditions are present over the entire length of the contact zone between the solutions.

It has been found that an alkaline aqueous solution having a pH in the range 8-12 provides the best results, and particularly the pH can advantageously be in the range 8.5-11.5, such as in the range 9-11, and preferably in the range 9-10. The establishment of a strongly buffered carbonate/bicarbonate solution will ensure that these conditions are met, but in the event it is desired to introduce carbon dioxide into the solution (e.g. via aerating the solution with a carbon dioxide-rich gas), care should be taken to ensure that a lowering of pH is counteracted—e.g. by addition of a base or by use of further buffer systems that can stabilise the pH of the alkaline aqueous solution.

The process of the invention is not particularly dependent on the concentration of the carbonate/bicarbonate in the alkaline aqueous solution—even a saturated solution comprising the two species in a ratio that provides the desired pH will be effective as long as the water solution includes at least a stoichiometric sufficient amount of calcium ions. The solubility in water of bicarbonate is 69 g/l at 0° C. and 96 g/l at 20° C. at a pressure of 1 bar, so if working at ambient pressure, the maximum concentration of bicarbonate will not exceed ≈90 g/l. However, it is within the scope of the present invention to run the process at higher pressures, thus allowing higher concentrations of bicarbonate and carbonate in the alkaline aqueous solution. This is e.g. relevant if carrying out the method of the first aspect of the invention in natural seawater at a certain depth—for each 10 m of submersion in sea water, the pressure will increase at about 1 bar, thus increasing the solubility of carbonate, bicarbonate.

Typically, the carbonate and bicarbonate ions of the alkaline aqueous solution will primarily be in the form of sodium carbonate and sodium bicarbonate, but it will be understood that the exact nature of any carbonate or bicarbonate salt is of minor relevance for the process of the first aspect of the invention. At any rate, as a consequence of the basic pH of the alkaline aqueous solution, there is a surplus of bicarbonate ions relative to carbonate ions in said solution.

With respect to the water solution, it typically has a pH>7.0, but in most cases this solution is only slightly basic: in this context, the pH of natural seawater has proven effective in the practice of the method of the invention. Hence the water solution preferably has a pH, which is less than 10, such as less than 9, and preferably in the range 7.5-8.5.

As mentioned above, it is a prerequisite for ikaite formation that calcium ions are present as long as bicarbonate and carbonate are supplied—therefore, the water solution should comprise the necessary amount, preferably an excess, of $Ca^{2+}$ relative to carbonate and bicarbonate in the alkaline aqueous solution.

In one important embodiment of the first aspect of the invention, the (saline) water solution is natural seawater—from an economical viewpoint this is preferable and attractive in many practical setups, but it is not in any way excluded to prepare "artificial seawater", i.e. water solutions that have the desired pH and the necessary $Ca^{2+}$ content—it may even be possible to prepare water solutions that are optimized for this purpose.

When selecting the rate of interaction between the two solutions—i.e. by controlling the feed of one solution into another—the formation of crystals is facilitated. Typically, the crystals will be seeded on and subsequently grow on the permeable or porous surface. Therefore, the rate of feeding one solution into the other is relevant for ensuring that the crystal formation will continue to take place in the interface between the two solutions.

It has been noted, however, that the flow rate should be kept relatively low (below a predefined rate) until nucleation of ikaite crystals has been accomplished—after nucleation has been accomplished, the flow rate can be increased since the crystals will readily grow. As an alternative, the porous or permeable surface can therefore be supplied/seeded with ikaite crystals that have already been formed (e.g. in a previous process of the present invention)—in this way, the relatively slow introductory step of crystal formation can be circumvented and the process can be run continuously at a higher rate.

With respect to the temperature, it has been reported in Stockmann G et al. (2018), Applied Geochemistry 89: 11-22, that ikaite can crystallise at temperatures up to about 15° C., but it is believed that lower temperatures are preferable: Typically the method of the invention will thus be carried out at a method not exceeding 14° C., such as at a temperature not exceeding 13° C., 12° C., 11° C., 10° C., 9° C., or 8° C. However, optimum temperatures for ikaite synthesis vary with various physico-chemical conditions e.g. the composition and concentrations of ASW constituents, concentration of the solutions 1-3 defined in the examples, pH of the solutions, and partial pressure.

Preparation of the alkaline aqueous solution will typically comprise that gaseous $CO_2$ is supplied to a carbonate solution, preferably to a sodium or potassium carbonate solution. In this context, it is merely necessary to ensure that the pH of the resulting solution does not attain a too low pH—addition of separate base or use of strong secondary buffers can ensure this.

In certain practical embodiments, the method of the invention can be carried out at sea (thus using the surrounding seawater as the water solution)—since the temperature in seawater varies across the globe but is consistently lower at a certain depth, the method in such cases carried out at a depth where the ambient temperature does not exceed 15° C. or the lower maximum temperature discussed in detail above.

In advantageous embodiments, the ikaite is subsequently converted to calcite or other carbonate forms—since ikaite is a relatively volatile substance, calcite and other forms for calcium carbonate are preferable, e.g. for later storage. The conversion to calcite or other forms of carbonate is a relatively simple matter, and essentially consists in dehydration of the ikaite: this can be accomplished by heating the ikaite to a temperature higher than the temperature at which the ikaite has been formed and/or by drying the ikaite.

Finally, the method of the first aspect of the invention will typically include the additional step of storing of the ikaite and/or carbonate forms produced.

Synthesis of ikaite or calcite can thus be performed by either controlled mixing of the ikaite solution into stagnant ASW or in a design allowing a flow of ASW. The flow rate of the ikaite solution and ASW can then be tuned to specific reactor designs for optimum crystallization and efficiency.

Embodiments of the $2^{nd}$ Aspect of the Invention

As will be understood from the above, an important aspect of the invention pertains to a method for storage/reduction of carbon dioxide. In essence, this method introduces gaseous carbon dioxide from any source into an alkaline aqueous solution discussed above where after ikaite or calcite or other carbonates are prepared according to the method of the first aspect of the invention detailed above; subsequently the ikaite and/or carbonate forms produced are stored, e.g. underground.

The method of the $2^{nd}$ aspect of the invention can be implemented in a variety of settings: it may be used directly in connection with carbon dioxide emitting plants, factories, devices or constructions, and it may be used to extract carbon dioxide directly from atmospheric air. Systems for introducing large amount of gaseous material into a liquid medium are well-known and may be employed for preparing the carbonate/bicarbonate buffer system that constitutes the alkaline aqueous solution used in the invention.

Embodiments Relating to the $3^{rd}$ Aspect of the Invention

This aspect relates to a system for preparation of ikaite, comprising
- at least one compartment for holding an alkaline aqueous solution, which comprises carbonate and bicarbonate,
- at least one compartment for holding a water solution, which comprises $Ca^{2+}$,
- at least one permeable or porous structure for separating the alkaline aqueous solution and the water solution, said permeable or porous structure allowing feeding through at least one surface of the structure 1) of the alkaline aqueous solution to the water solution or 2) of the water solution to the alkaline aqueous solution,
- a mechanism for causing the feeding of either the alkaline aqueous or the water solution through the at least one surface of the structure.

A schematic depiction of one embodiment of such a system (or plant) of the invention is presented in FIG. 6. A first compartment "A" holds a carbonate/bicarbonate solution which is continuously fed to the bottom of a second compartment B, which holds an ASW. Via a perforated or otherwise permeable surface the carbonate/bicarbonate solution enters the ASW so as to create a steady interface where ikaite crystals can be formed (as shown in the enlarged panel C). Since the carbonate/bicarbonate solution is less dense than the ASW (in particular after the ikaite formation), it exhibits an upward movement and thus allows for a constant addition of new carbonate/bicarbonate.

Preferably a system of the invention will further comprise a device for supplying carbon dioxide to the alkaline aqueous solution. With reference to FIG. 6, such a device can be present in compartment A or in a premixing chamber or compartment—one simple means for supplying carbon dioxide to the solution is to bubble carbon dioxide rich gas/air through the solution.

It is advantageous to adapt the system of the invention so as to facilitate recovery of ikaite from the porous matrix and/or water solution. Various solutions for this purpose exists. One example is to let the surface on which ikaite is formed to be tilted relative to a horizontal plane; since ikaite is quite fragile, the gravitational pull will at some point cause the ikaite to break off and settle at the foot of the tilted surface. Alternatively a mechanical mechanism that simply scrapes off and optionally collects the ikaite can be included in the system.

As detailed above in relation to the first aspect of the invention, the ikaite produced can conveniently be converted to calcite or other stable carbonate forms to allow long term storage; consequently, the system of the invention may further comprise a compartment for conversion of ikaite to calcite or other carbonate forms by drying or heating to a temperature >8° C. However, the ikaite may also simply be deposited at a remote location where this process takes place.

The system of the invention can be integrated with or coupled to an outlet of carbon dioxide containing gas emissions; these emissions are typically supplied to the alkaline aqueous solution, preferably by using the device detailed above for introducing of carbon dioxide into the alkaline aqueous solution.

The water solution can conveniently be natural saltwater, e.g. seawater, especially when the system is set up in geographical areas where easy access to abundant amounts of natural salt water is available. In such cases, the system can be located in an off-shore position (thereby taking advantage of the lower temperatures present at certain depths of the sea in order to facilitate the ikaite formation), but the system can also be located on land and take advantage of natural salt water.

As also detailed above, the exact form and composition of the permeable or porous structure is not essential—it can be comprised of porous rock or stone, a membrane material and any other material through which a solution can be introduced and subsequently leave when forming an interface with a second solution because the structure has a sufficiently high hydraulic conductivity. Therefore, it is in advantageous embodiments of the invention possible to utilise natural geologic formations that have a suitable hydraulic conductivity, which allows the creation of a steady interface between two solutions (one being fed into the other from the permeable porous structure.

It is in practice also possible to create the necessary interface zone between the two solutions by establishing layers (strata) of the solutions having different densities—this principle is known when establishing a gradient of e.g. sucrose when performing differential centrifugation. In such a setup the formation of the ikaite crystals will take place in those strata of the two solutions where the reactant concentrations are optimal for the ikaite formation to take place. However, feeding of a solution through a porous surface is preferred because this technology facilitates that a controlled amount of solution is contacted with the other solution over time in a simple manner, whereas establishment of permanent strata/layers of different densities is more difficult to control in terms of addition of reactants.

And, if using a system with parallel laminar flow of solutions, it cannot be expected that optimum reaction conditions are present over the entire length of the contact zone between the solutions.

With respect to the system of the $3^{rd}$ aspect of the invention, all disclosures presented herein in relation to the first—and when applicable, second—aspect(s) of the invention apply mutatis mutandis to the system of the $3^{rd}$ aspect. Thus, all disclosure relating to the reagents and conditions useful in the first and $2^{nd}$ aspects can be directly incorporated when implementing a system of the $3^{rd}$ aspect.

Preamble to Examples
Material and Methods
Precipitation Procedures
Background concentration of carbonate:

If carbonate or bicarbonate is dissolved in water a re-equilibration takes place according to the following equations:

$$HCO_3^- \leftrightarrows CO_3^{2-} + H^+ \quad pKa=10.33$$

$$CO_2 + H_2O \leftrightarrows HCO_3^- + H^+ \quad pKa=6.35$$

Sodium ions will not adsorb to particulate matter, but remains in the aqueous phase. In water, carbonate ions will re-equilibrate until an equilibrium is established.

Only a small fraction of the dissolved $CO_2$ is present in the form of $H_2CO_3$, the major part is present as truly dissolved $CO_2$. The amount of $CO_2$ in water is in equilibrium with the partial pressure of $CO_2$ in the surrounding atmosphere. The $CO_2/HCO_3^-/CO_3^{2-}$ equilibria constitute the major buffer of the pH of freshwater and seawater throughout the world.

Based on the above equations, $CO_2$ is the predominant species at a pH smaller than 6.35, while $HCO_3^-$ is the predominant species at a pH in the range of 6.35-10.33 and $CO_3^{2-}$ is the predominant species at a pH higher than 10.33.

Artificial Seawater (ASW)

ASW can be created by a multitude of saline-solutions, see for example the recipe below. In the present invention, comprehensive precipitation yields have been achieved with artificial seawater as well as natural seawater; it has been found that the solutions needs to be of a certain degree of salinity and display slightly alkaline pH values. Other inorganic solutes such as phosphate, nitrates etc. does not seem to affect the precipitation process. The invention is not limited to the use of a specific solution.

ASW can also be substituted by a $CaCl_2$ solution, or other sources of calcium ions in solution for the precipitation process to occur. Sufficient available calcium and carbonate ions in the solution appears to be the most important parameters.

Governing formulas containing ASW; the complexity of seawater, artificial or natural can contain multiple other constituents which renders the reactions much more complicated.

Solutions:
1. $Na_2CO_3$ (aq) Sodium carbonate dissolved in water (See above for equilibrium equations)
2. $NaHCO_3$ (aq), i.e. Sodium bicarbonate dissolved in water (See above for equilibrium equations)
3. $Na_2CO_3$ (aq)+$NaHCO_3$ (aq), i.e. Sodium carbonate+Sodium bicarbonate dissolved in water
4. $Na_2CO_3$ (aq)+$CO_2$ (g)=Solution 3
   ($CO_2$ bubbling yields a higher proportion of $HCO_3^-$ and $CO_3^{2-}$ in equilibrium, the latter being dominant at high pH; however, since $CO_2$ will have influence on the equilibrium in a direction towards a more acidic pH, which does not favour ikaite formation, $CO_2$ bubbling can advantageously be supplemented by pH increasing measures, i.e. use of a stronger buffer system or addition of alkaline substances)
5. ASW*

Reactions:
1. $CO_2$ (g)$\leftrightarrows CO_2$ (aq) ($CO_2+H_2O \leftrightarrows H_2CO_3 \leftrightarrows H^+ + HCO_3^- \leftrightarrows 2H^+ + CO_3^{2-}$)
2. $Na_2CO_3$ (aq)+$CO_2$ (aq)+$H_2O \leftrightarrows 2Na^+ + CO_3^{2-} + H^+ + HCO_3^-$ (Solution 3)
3. $HCO_3^- \leftrightarrows CO_3^{2-} + H^+$
4. $Ca^{2+} + HCO_3^- \leftrightarrows CaHCO_3^+$ (Calcium ions are derived from ASW or other suitable saline solutions)
5. $Ca^{2+} + CO_3^{2-} \leftrightarrows CaCO_3$ (Calcium ions are from ASW)
6. $Ca^{2+} + CO_3^{2-} + 6H_2O \rightarrow CaCO_3 \cdot 6H_2O$ (s) (ikaite)
7. $CaCO_3 \cdot 6H_2O$ (s)+heat (>8-15° C.)/dehydration→$CaCO_3$ (s) (Calcium carbonate/calcite or other morphs of $CaCO_3$)

Hence from reactions 4 and 5 $CaHCO_3^+$ and $CaCO_3$ exist, creating a calcium carbonate solution also containing $HCO_3^-$, $Ca^{2+}$ and $CO_3^{2-}$. The ratio between these, in particular $HCO_3^-/CO_3^{2-}$, and pH is likely to control the precipitation process of ikaite, thus bubbling of $CO_2$ in $Na_2CO_3$ dissolved in $H_2O$ increases the proportion of $HCO_3^-$ and $CO_3^{2-}$ in the solution, resulting in higher ikaite precipitation at high pH, see below.

*ASW Recipe Used in Examples (Salts Dissolved in Deionized $H_2O$):

The following recipe of ASW was used for the examples presented here, however, other concentrations of the different constituents can be used as well, and the invention is thus not limited to what is exemplified here. For instance, analogous experiments using salts dissolved in tap water from Denmark showed similar results as the experiments here. However, the exact mineral content of tap water is unknown.

Chloride ($Cl^-$) —19,000-19,500 mg/l
Sodium ($Na^+$)—9,720-11,880 mg/l
Magnesium ($Mg^{2+}$)—1,300-1,360 mg/l
Sulfate ($SO_4^{2-}$)—810-990 mg/l
Calcium ($Ca^{2+}$)—410-430 mg/l
Potassium ($K^+$)—360-380 mg/l
Fluoride ($F^-$)—1.2-1.3 mg/l
Bromide ($Br^-$)—4.05-5.0 mg/l
Strontium ($Sr^{2+}$)—7.2-8.8 mg/l The most common salts in natural seawater are set forth with their concentration ranges in the following:

Chloride ($Cl^-$)—18.980 mg/l
Sodium ($Na^+$)—10.556 mg/l
Sulfate ($SO_4^{2-}$)—2.649 mg/l
Magnesium ($Mg^{2+}$)—1.262 mg/l
Calcium ($Ca^{2+}$)—400 mg/l
Potassium ($K^+$)—380 mg/l
Bicarbonate ($HCO_3^-$)—140 mg/l
Strontium ($Sr^{2+}$)—13 mg/l
Bromide ($Br^-$)—65 mg/l
Borate ($BO_3^{3-}$)—26 mg/l
Fluoride ($F^-$)—1 mg/l
Silicate ($SiO_3^{2-}$)—1 mg/l
Iodide ($I^-$)—<1 mg/l
Total dissolved solids—34.483 mg/l The experiments in the following examples were carried out at 5° C.±0.25° C.

ASW in the experiments in the following examples was made by dissolving a commercially available salt/mineral mix for reef aquaria in freshwater (regular tap-water). The ASW was mixed to 25‰ salinity by dissolving 1000 g of the salt mix with 40 l of freshwater in a glass container, final salinity was confirmed with refractometer.

A pH meter, calibrated at experimental temperature by a two-point calibration (pH 7 and 10), was used to monitor pH. pH of the ASW was ~8.17.

Example 1

$Na_2CO_3$+$NaHCO_3$ dissolved in demineralized $H_2O$ to synthesize ikaite in ASW.

A solution of ~1% of $Na_2CO_3$ (s)+$NaHCO_3$ (s) in a ratio of 4:1 by weight of $Na_2CO_3$:$NaHCO_3$ was mixed in demineralized $H_2O$, adding up to 100% by volume, creating "solution 3" (cf. above) with pH 10.21.

Solution 3 was then slowly being mixed with ASW through a flat porous sandstone of 78 cm² with pore sizes of ~50-150 μm placed on the bottom of 40 l glass container filled with ASW. The solution was fed to the sandstone through a silicone tube by gravitational force, and flow velocity adjusted by a tube clamp to ~1 ml pr. min. Within minutes, visible ikaite crystals were evident on the surface of the sand stone, as Solution 3 is lighter due to the lower salinity it will have a natural buoyancy, creating an upward drift when entering the heavier ASW.

Figure 1:
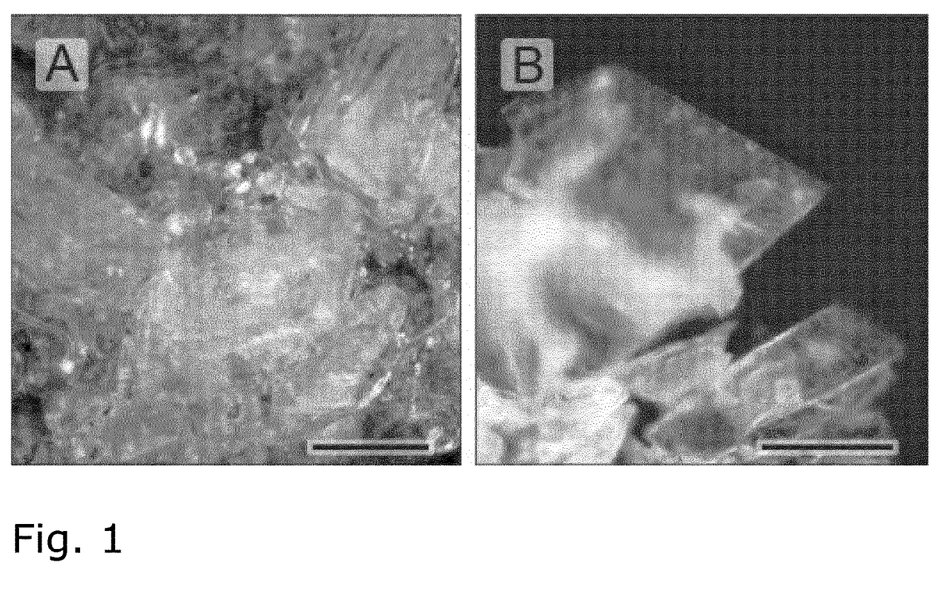
FIG. 1 shows micrographs of synthesized ikaite.
Panel A displays the surface of a flow-through surface covered by ikaite crystals.
Panel B displays a close-up of ikaite crystals. the scale bar represents 1 mm. Cf. example 1.

A dense layer of crystals covered the sandstone after 1 h. Identification and size of ikaite crystals was performed using a USB-microscope, showing monoclinic ikaite crystals up to ~1.5-2 mm in length. See FIG. 1.

Example 2

$Na_2CO_3$+$NaHCO_3$ dissolved in tap-water to synthesize ikaite in ASW.

A solution of ~1% of $Na_2CO_3$ (s)+$NaHCO_3$ (s) in a ratio of 4:1 by weight of $Na_2CO_3$:$NaHCO_3$ was mixed in tap water adding up to 100% by volume, creating "solution 3" with pH 10.03.

Solution 3 was then slowly being mixed with ASW through a flat porous sandstone of 78 cm² with pore sizes of ~50-150 μm placed on the bottom of 40 l glass container filled with ASW. The solution was fed to the sandstone through a silicone tube by gravitational force, and flow velocity adjusted by a tube clamp to ~1 ml pr. min. Within minutes visible ikaite crystals were evident on the surface of the sand stone, as "Solution 3" is lighter due to the lower salinity it will have a natural upward drift when entering the heavier ASW.

Figure 2:
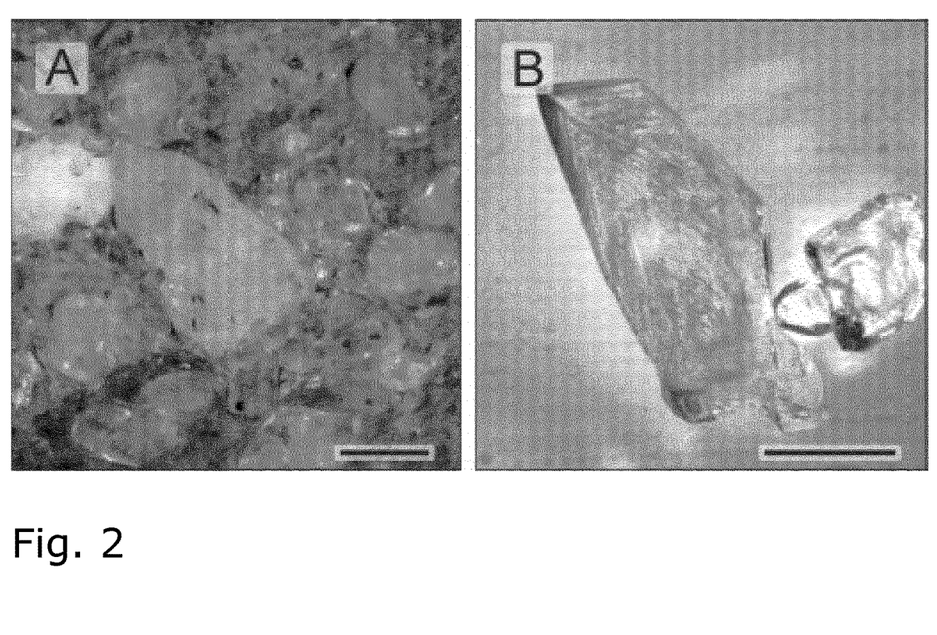
FIG. 2 shows micrographs of synthesized ikaite.
Panel A displays the surface of the flow through membrane covered by ikaite crystals.
Panel B displays a close-up of ikaite crystals. The scale bar represents 1 mm. Cf. example 2.

A dense layer of crystals covered the sandstone after 1 h. Identification and size of ikaite crystals was performed using a USB-microscope, showing monoclinic ikaite crystals up to ~1.5-2 mm in length. See FIG. 2.

Example 3

Creating $NaHCO_3$ by bubbling $CO_2$ through a solution of $Na_2CO_3$ to create Solution 3 (in demineralized $H_2O$)

1 l of Solution 1 was bubbled with $CO_2$ for 1 min. creating Solution 2, i.e. when sodium carbonate reacts with carbon dioxide and water, sodium bicarbonate is primarily produced (see also formula 2 above).

$Na_2CO_3(aq,s)+CO_2(g)+H_2O \rightarrow 2NaHCO_3(aq)$ 20 ml of Solution 2 was then mixed with 80 ml of Solution 1 which was then added to 9.9 l demineralized $H_2O$ creating a 1% 10 l Solution 3, with a ratio of 4:1 (v/v) of $Na_2CO_3$:$NaHCO_3$, pH 9.29.

Solution 3 was then slowly mixed with ASW through a flat porous sandstone of 78 cm² with pore sizes of ~50-150 μm placed on the bottom of 40 l glass container filled with ASW. The solution was fed to the sandstone through a silicone tube by gravitational force, and flow velocity adjusted by a tube clamp to ~1 ml pr. min. Within minutes visible ikaite crystals were evident on the surface of the sand stone, as Solution 3 is lighter due to the lower salinity it will have a natural upward drift when entering the heavier ASW.

Figure 3:
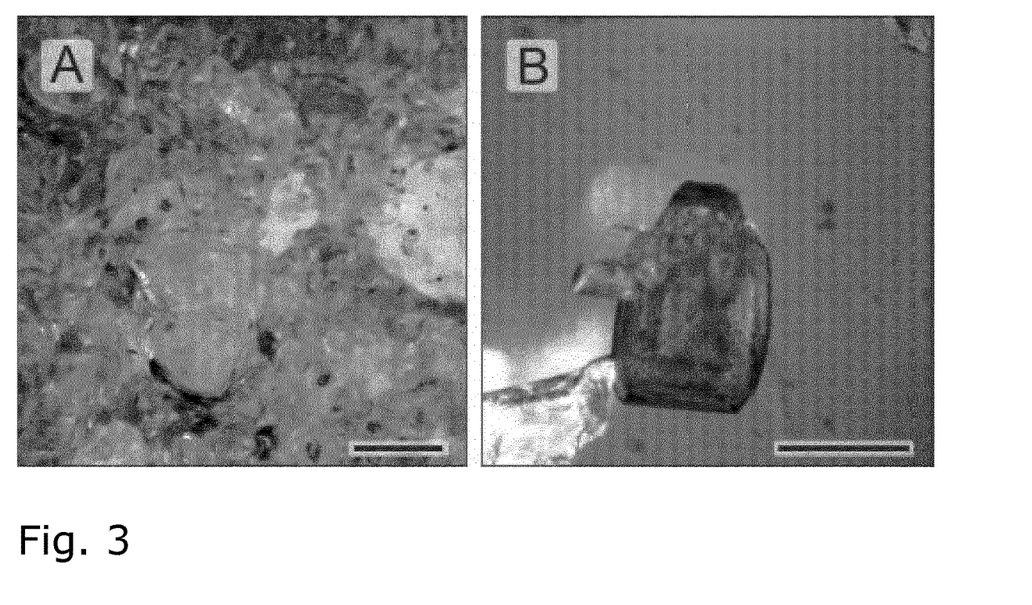
FIG. 3 shows micrographs of synthesized ikaite.
Panel A displays the surface of the flow through membrane covered by ikaite crystals.
Panel B displays a close-up of ikaite crystals. The scale bar represents 1 mm. Cf. example 3.

A dense layer of crystals covered the sandstone after 1 hour. Identification and size of ikaite crystals was performed using a USB-microscope, showing monoclinic ikaite crystals up to ~1.5-2 mm in length. See FIG. 3.

Example 4

Creating $NaHCO_3$ by bubbling $CO_2$ through a solution of dissolved $Na_2CO_3$ to create Solution 3 (in tap water).

1 l of Solution 1 was bubbled with $CO_2$ for 1 min. creating Solution 2, i.e. when sodium carbonate reacts with carbon dioxide and water, sodium bicarbonate is produced.

$Na_2CO_3(aq,s)+CO_2(a)+H_2O \rightarrow 2NaHCO_3(aq)$ 20 ml of Solution 2 was then mixed with 80 ml of Solution 1, which was then added to 9.9 l of tap water creating a 1% 10 l Solution 3, with a ratio of 4:1 (v/v) of $Na_2CO_3$:$NaHCO_3$, pH 9.20.

Solution 3 was then slowly mixed with ASW through a flat porous sandstone of 78 cm² with pore sizes of 50-150 μm placed on the bottom of 40 l glass container filled with ASW.

The solution was fed to the sandstone through a silicone tube by gravitational force, and flow velocity adjusted by a tube clamp to ~1 ml per min. Within minutes, visible ikaite crystals were evident on the surface of the sand stone, as Solution 3 is lighter due to the lower salinity it will have a natural upward drift when entering the heavier ASW.

Figure 4:
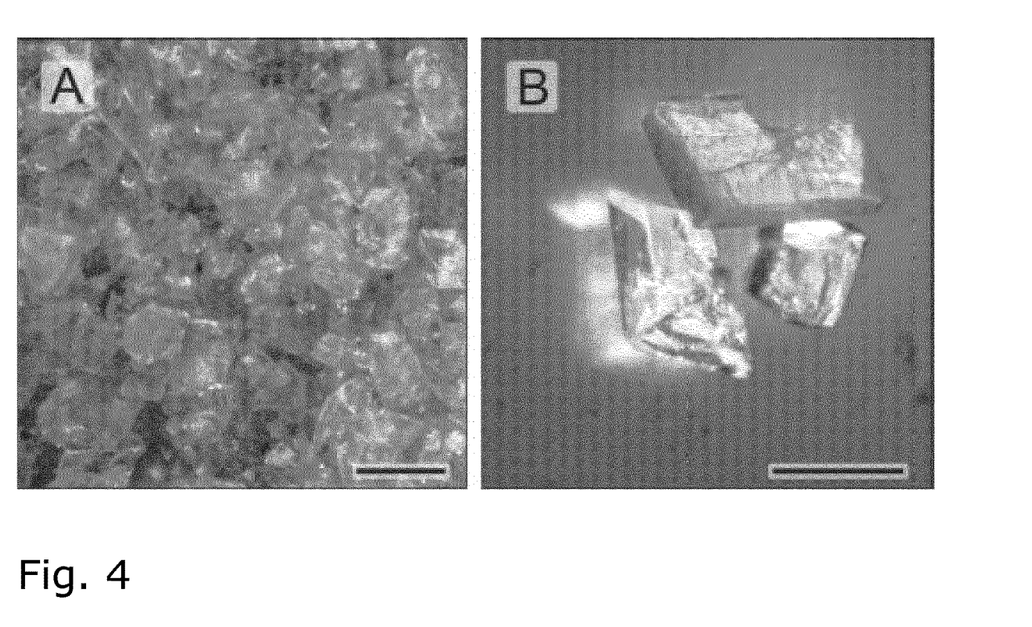
FIG. 4 shows micrographs of synthesized ikaite.
Panel A displays the surface of the flow through membrane covered by ikaite crystals.
Panel B displays a close-up of ikaite crystals. The scale bar represents 1 mm.

A dense layer of crystals covered the sandstone after 1 h. Identification and size of ikaite crystals was performed using a USB-microscope, showing monoclinic ikaite crystals up to ~1.5-2 mm in length. See FIG. 4.

Example 5

Medium Scale Ikaite Synthesis

The following experiment was performed in a cooling room, where the temperature was set to 5° C.

During European summertime, 420 l of seawater, PSU 24, pH 8.3, was collected with a drain pump submerged to a depth of 1 m at mid-tide in the Great Belt of the coast of Zealand, Denmark*. The collected seawater was first filtered for large particles with a filter mesh of approximately 1 mm, then the flow continued through a 200 µm filter sock, taking out smaller particles. The filtered water was first pumped into to one 250 l container which was connected to an additional 250 l container by a 20 m long hose running on the cold steel floor of the cooling room, hereby increasing cooling efficiency. The initial water temperature was 21° C., and after continuous circulation of water between the two 250 l containers for 24 hours the temperature was 8° C. where the experiment was commenced. The following 12 hours the water temperature decreased to and stabilized at 5° C.

*) The initial water temperature of the collected water was rather high, this of course should be taken into account, if a more permanent and/or larger scale facility is to be constructed. It would be of great advantage to collect water from deeper waters where salinity is higher, and temperature is lower.

Preparation of 60 L of "Solution 3"

1 l of Solution 1 was bubbled with $CO_2$ for 1 min. creating Solution 2, i.e. when sodium carbonate reacts with carbon dioxide and water, sodium bicarbonate is produced.

$$Na_2CO_3(aq,s)+CO_2(g)+H_2O \rightarrow 2NaHCO_3(aq)$$

150 ml of Solution 2 was then mixed with 450 ml of Solution 1, the mixture was then added to 59.4 l tap water creating a 1% 60 l Solution 3, with a ratio of 4:1 (v/v) of $Na_2CO_3$:$NaHCO_3$, pH 10.24.

Figure 5:
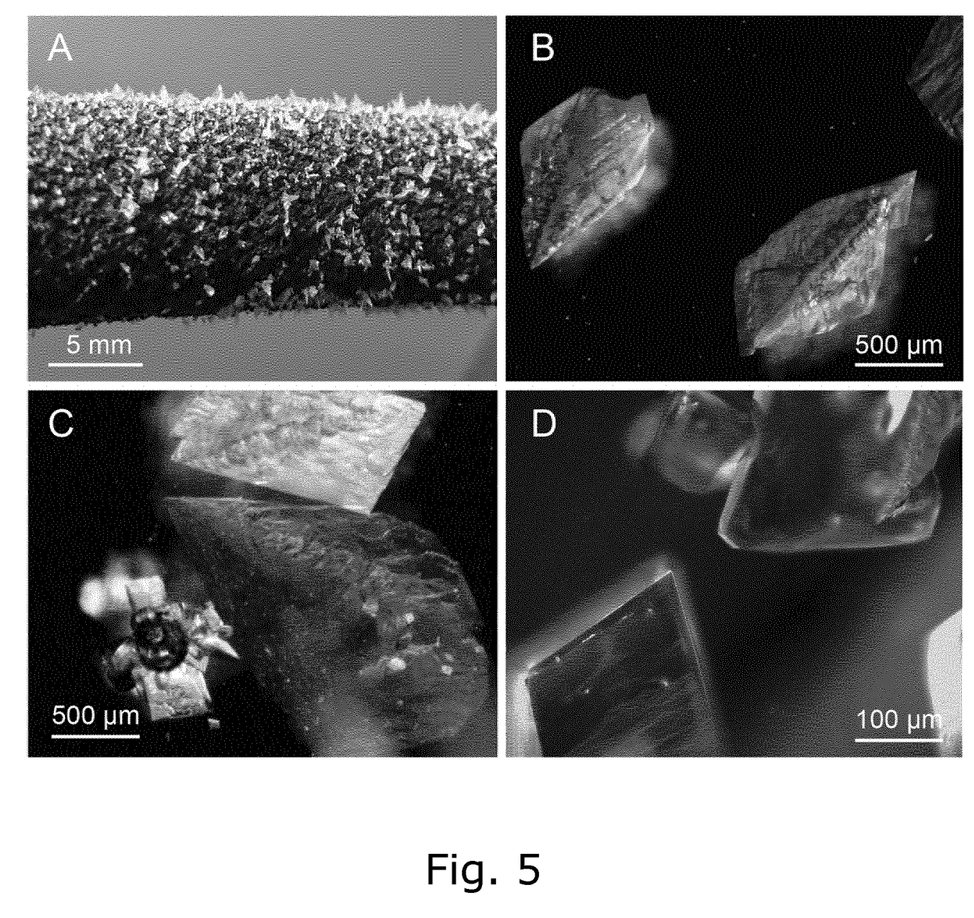
FIG. 5 shows images of synthesized ikaite.
Panel A displays a hose covered in newly synthesized ikaite crystals, scalebar represent 5 mm.
Panel B displays a close-up of ikaite crystals. The scale bar represents 500 µm.
Panel C displays a close-up of ikaite crystals. The scale bar represents 500 µm.
Panel D displays a close-up of ikaite crystals. The scale bar represents 100 µm.

Solution 3 was then slowly mixed with seawater through a 3 m long porous soaker hose, the hose positioned in a spiraling fashion within one of the 250 l containers with seawater. The pores of the hose allowed for a slow even flow on relatively large surface area in contact with the seawater. The solution was fed through the hose by a submergible circulation pump with adjustable flow, and flow velocity was adjusted to ensure that a slow flow leaving the hose could be detected as small "fumes" of water with lower density rising towards the surface; as Solution 3 is less dense due to the lower salinity it will have a natural upward drift when entering the heavier seawater. Large white crystals where visible all over the hose shortly after the flow began, two hours later the hose was completely covered in crystals, cf. FIG. 5. Identification and size of ikaite crystals was performed using a USB-microscope, showing monoclinic ikaite crystals up to ~1.5-2.5 mm in length. See FIG. 5.

Further Steps

After ikaite synthesis as detailed in the above examples, the ikaite can readily be converted to calcite by raising the temperature a few degrees, e.g. above 6-8° C. when the preparation of the ikaite has been prepared at such a temperature, or the ikaite can be left to dehydrate. Generally, ikaite is only staying metastable at temperatures below 6° C. and will naturally disintegrate into calcite, but in order to facilitate this process, elevated temperatures/drying should be applied. Calcite, in turn, is useful in a variety of products, such as construction materials, paint, as a soil remediator and/or stabilisator and as a material for repair of concrete.

The invention is not limited to the use of the specific above-mentioned solutions, as ikaite synthesis can be achieved by other means, e.g. by mixing of other agents, such as $CaCl_2$, $K_2CO_3$ and KOH at low temperatures. However, other means would often require the presence of certain inhibitors in order to avoid formation of other types of crystals. The formulations included here have been chosen as they rapidly produce large clean ikaite crystals when used in the method of the invention, and they require a low amount of energy for successful synthesis of ikaite and later calcite withholding the carbon from the captured $CO_2$. The solutions highlighted in formulas 1-5 are also inexpensive, non-toxic and constituted by abundant chemicals and would thus be most favourable while also being the most cost-effective approach.

The invention claimed is:

1. A method for preparation of ikaite ($CaCO_3$ $6H_2O$), comprising contacting an alkaline aqueous solution, which comprises carbonate and bicarbonate ions, with a water solution, which comprises $Ca^{2+}$, at a temperature not exceeding 15° C., wherein contact between the alkaline aqueous solution and the water solution takes place at a permeable or porous surface, through which the alkaline aqueous solution is fed to the water solution or through which the water solution is fed to the alkaline aqueous solution at a flow rate, which is actively controlled to facilitate formation of ikaite crystals, and wherein the alkaline aqueous solution has been prepared by supplying gaseous $CO_2$ to a carbonate solution.

2. The method according to claim 1, wherein the alkaline aqueous solution has a pH in the range 8-12.

3. The method according to claim 2, wherein the pH is in the range 8.5-11.5.

4. The method according to claim 1, wherein the carbonate and bicarbonate ions of the alkaline aqueous solution primarily are in the form of sodium carbonate and sodium bicarbonate.

5. The method according to claim 1, wherein the alkaline aqueous solution comprises a surplus of bicarbonate ions relative to carbonate ions.

6. The method according to claim 1, wherein the water solution has a pH >7.0.

7. The method according to claim 6, wherein the pH is less than 10.

8. The method according to claim 1, wherein the water solution comprises an excess of $Ca^{2+}$ relative to carbonate and bicarbonate in the alkaline aqueous solution.

9. The method according to claim 1, wherein the water solution is natural seawater.

10. The method according to claim 1, wherein the ikaite crystalizes on the permeable or porous surface.

11. The method according to claim 1, which is carried out at a temperature not exceeding 14° C.

12. A method for preparation of ikaite ($CaCO_3$ $6H_2O$), comprising contacting an alkaline aqueous solution, which comprises carbonate and bicarbonate ions, with a water solution, which comprises $Ca^{2+}$, at a temperature not exceeding 15° C., wherein contact between the alkaline aqueous solution and the water solution takes place at a permeable or porous surface, through which the alkaline aqueous solution is fed to the water solution or through which the water solution is fed to the alkaline aqueous solution at a flow rate, which is controlled to facilitate formation of ikaite crystals, and wherein the alkaline aqueous solution has been prepared by supplying gaseous $CO_2$ to a carbonate solution, wherein the flow rate does not exceed a predefined rate until nucleation of ikaite crystals has been accomplished.

13. The method according to claim 12, wherein the flow rate is increased after ikaite crystals have been nucleated.

14. The method according to claim 1, wherein the carbonate solution is a sodium or potassium carbonate solution.

15. The method according to claim 1, which is carried out at sea at a depth where the ambient temperature does not exceed 15° C. or the temperature defined in claim 11.

16. The method according to claim 1, wherein the ikaite is subsequently converted to calcite or other carbonate forms.

17. The method according to claim 16, comprising heating the ikaite to a temperature above the temperature at which the ikaite has been formed and/or by drying the ikaite.

18. The method according to claim 1, which comprises subsequent storage of the ikaite and/or carbonate forms produced.

19. The method according to claim 1, wherein the control is by means of a pumping system.

20. The method according to claim 1, wherein the control is by use of a gravitational force.

21. The method according to claim 2, wherein the pH is in the range 9-11.

22. The method according to claim 2, wherein the pH is in the range 9-10.

23. The method according to claim 6, wherein the pH is less than 9.

24. The method according to claim 6, wherein the pH the range 7.5-8.5.

25. The method according to claim 16 comprising subsequently storing the carbonate forms produced.

26. The method according to claim 1, which is carried out at a temperature not exceeding 13° C.

27. The method according to claim 1, which is carried out at a temperature not exceeding 12° C.

28. The method according to claim 1, which is carried out at a temperature not exceeding 11° C.

29. The method according to claim 1, which is carried out at a temperature not exceeding 10° C.

30. The method according to claim 1, which is carried out at a temperature not exceeding 9° C.

31. The method according to claim 1, which is carried out at a temperature not exceeding 8° C.

32. The method according to claim 1 comprising subsequently storing the ikaite produced.

* * * * *

UNITED STATES PATENT AND TRADEMARK OFFICE
CERTIFICATE OF CORRECTION

PATENT NO. : 11,618,688 B2
APPLICATION NO. : 17/050304
DATED : April 4, 2023
INVENTOR(S) : Erik Trampe It is certified that error appears in the above-identified patent and that said Letters Patent is hereby corrected as shown below:

In the Claims

Column 16, Claim 24, Line 11, after "pH" insert -- is in --.

Signed and Sealed this
First Day of August, 2023

Katherine Kelly Vidal
*Director of the United States Patent and Trademark Office*